(12) United States Patent
Finch (10) Patent No.: US 10,310,067 B2
(45) Date of Patent: Jun. 4, 2019

(54) WIND TURBINE MITIGATION IN RADAR SYSTEMS

(71) Applicant: BAE SYSTEMS plc, London (GB)

(72) Inventor: Derek Geoffrey Finch, Cowes Hampshire (GB)

(73) Assignee: BAE SYSTEMS plc, London (GB)

(*) Notice: Subject to any disclaimer, the term of this patent is extended or adjusted under 35 U.S.C. 154(b) by 469 days.

(21) Appl. No.: 14/786,827

(22) PCT Filed: Apr. 22, 2014

(86) PCT No.: PCT/GB2014/051237
§ 371 (c)(1),
(2) Date: Oct. 23, 2015

(87) PCT Pub. No.: WO2014/174267
PCT Pub. Date: Oct. 30, 2014

(65) Prior Publication Data
US 2016/0069993 A1    Mar. 10, 2016

(30) Foreign Application Priority Data

Apr. 24, 2013  (EP) ..................................... 13275095
Apr. 24, 2013  (GB) ..................................... 1307381.2

(51) Int. Cl.
*G01S 13/524*  (2006.01)
*G01S 7/288*  (2006.01)

(52) U.S. Cl.
CPC ...... *G01S 13/5248* (2013.01); *G01S 13/5246* (2013.01); *G01S 2007/2886* (2013.01)

(58) Field of Classification Search
CPC .......................... G01S 13/5248; G01S 13/5246
(Continued)

(56) References Cited

U.S. PATENT DOCUMENTS 4,068,231 A * 1/1978 Wilmot ................. G01S 7/2923
342/159
5,311,188 A    5/1994 Meijer et al.
(Continued)

FOREIGN PATENT DOCUMENTS

EP    0547686 A1    6/1993
GB    2481290 A    12/2011
(Continued)

OTHER PUBLICATIONS

Merrill I. Skolnik: Radar Handbook, Third Edition. Chapter 25 Radar Digital Signal Processing, Chapter (McGraw-Hill Professional, 2008), AccessEngineeringhttps://www.accessengineeringlibrary. com/browse/radar-handbook-third-edition/p20014d3499725_1001 (Year: 2008).*

(Continued)

*Primary Examiner* — Marcus E Windrich
(74) *Attorney, Agent, or Firm* — Finch & Maloney PLLC (57) ABSTRACT

Disclosed is an ATC Radar and a method of operating an ATC Radar, including the steps of: receiving In-phase (I) and Quadrature (Q) signals; creating first and second complex clutter maps using the I and Q signals; wherein the first map comprises data which is dynamically updated on a per-scan basis and the second map comprises data indicative of a static environment with no targets; subtracting data from the second map from the received I and Q signals to mitigate the effects of static objects in the environment, to yield compensated I and Q data; and using the compensated I and Q data for target detection and/or tracking.

14 Claims, 3 Drawing Sheets

(58) Field of Classification Search
USPC .................................................. 342/159–164
See application file for complete search history.

(56) References Cited

U.S. PATENT DOCUMENTS

| | | | |
|---|---|---|---|
| 5,327,141 A | 7/1994 | Sheldon | |
| 5,990,824 A | 11/1999 | Harrison | |
| 6,307,501 B1* | 10/2001 | Wills | G01S 13/5242 342/159 |
| 7,675,458 B2* | 3/2010 | Hubbard | G01S 13/5246 342/159 |
| 8,344,937 B2* | 1/2013 | Drake | G01S 7/024 342/36 |
| 8,717,230 B1* | 5/2014 | Fischi | G01S 7/2813 342/159 |
| 2010/0073218 A1* | 3/2010 | Stockmann | G01S 7/2923 342/146 |
| 2010/0265122 A1* | 10/2010 | Oswald | G01S 13/42 342/136 |
| 2011/0223031 A1* | 9/2011 | Bond | G01S 7/414 416/229 R |
| 2011/0241928 A1* | 10/2011 | Oswald | G01S 13/42 342/90 |
| 2011/0260908 A1* | 10/2011 | New | G01S 7/023 342/59 |
| 2012/0105272 A1 | 5/2012 | Moruzzis et al. | |
| 2016/0025849 A1* | 1/2016 | Wang | G01S 7/023 342/59 |

FOREIGN PATENT DOCUMENTS

| | | |
|---|---|---|
| JP | H11118920 A | 4/1999 |
| WO | 2010067057 A2 | 6/2010 |
| WO | 2010086858 A1 | 8/2010 |
| WO | 2014174267 A1 | 10/2014 |

OTHER PUBLICATIONS

International Preliminary Report on Patentability received for Patent Application No. PCT/GB2014/051237 dated Nov. 5, 2015. 8 pages.

Sqiongqiong, et al., "Recognition and Supression of Wind Farm Clutter via Dynamic Clutter Map," Signal Processing (ICSP), 2012 IEEE 11th International Conference on IEEE, Oct. 21, 20112. pp. 1949-1952.

International Search Report and Written Opinion received for Patent Application No. PCT/GB2014/051237 dated May 22, 2014. 12 pages.

GB Intellectual Property Office Search Report under Section 17(5) received for GB Patent Application No. 1307381.2 dated Oct. 22, 2013. 4 pages.

Extended European Search Report received for EP Patent Application No. 13275095.1 dated Sep. 11, 2013. 8 pages.

Anonymous: "Futher Evidence of The Effects of Wind Turbine Farms on AD Radar," first retrieved from the Internet on Mar. 31, 2010 at URL: http://www.dtic.mil/cgi-bin/GetTRDoc?AD=ADA466373 &Location=U2&doc=GetTRDoc.pdf. 57 pages.

Theil, et al., "Radar and Wind Turbines: A Guide to Acceptance Criteria," Radar Conference, IEEE, May 10, 2010. pp. 1355-1361.

* cited by examiner

WIND TURBINE MITIGATION IN RADAR SYSTEMS

FIELD

The present invention relates to a Radar system, particularly an Air Traffic Control (ATC) Radar system, and the means by which it is able to better operate in the vicinity of one or more wind turbines and, particularly, a windfarm comprising a plurality of wind turbines.

BACKGROUND TO THE PRESENT INVENTION

It is increasingly common to provide windfarms for the generation of electrical power. These windfarms may be located offshore or onshore. The presence of such windfarms, or even a single wind turbine, can pose problems to the operation of nearby Radar systems, which may be provided at civilian or military airports or airbases, which will hereafter be collectively referred to as airfields.

The returns from a wind turbine can be relatively large, compared to the return from a desired target, meaning that is potentially very difficult, if not impossible, to identify a wanted target from amongst the returns from a wind turbine or windfarm.

In the following description, reference will be made to a problems caused by a wind turbine, but the skilled person will appreciate that the problem is exacerbated by the presence of more than a single wind turbine in a typical windfarm scenario.

Prior art attempts to address the problem of wind turbines have involved simply ignoring any returns from the direction in which the wind farm is located. This introduces the problem that any aircraft approaching from that direction are not visible, and this is seldom a desirable solution.

Other attempts to address the problem have involved coating the turbine blades with a Radar-absorbent material. This is not found to be particularly effective either, and is rather expensive.

In practical terms, the problem is normally addressed by prohibiting the erection of wind turbines in the vicinity of ATC Radar systems. However, given the growing desire to generate electricity from more environmentally friendly sources, this places an undesirable limit on the locations where windfarms may be erected. This is particularly so in a densely populated country where there are relatively many airfields, which may have overlapping ATC Radar coverage, and which would otherwise rule out vast areas from windfarm consideration.

There is therefore a desire to mitigate the effects of wind turbines, such that they may be erected in the vicinity of airfields and, hence, ATC Radar systems, without adversely affecting the performance of such ATC Radar systems.

SUMMARY OF THE INVENTION

According to a first aspect of the present invention, there is provided a method of operating an ATC Radar, comprising the steps of: receiving In-phase (I) and Quadrature (Q) signals; creating first and second complex clutter maps using the I and Q signals; wherein the first map comprises data which is dynamically updated on a per-scan basis and the second map comprises data indicative of a static environment with no targets; subtracting data from the second map from the received I and Q signals to mitigate the effects of static objects in the environment, to yield compensated I and Q data; using the compensated I and Q data for target tracking.

Preferably, the first and second complex clutter maps each comprise a plurality of cells, each cell corresponding to a defined region, and wherein if data recorded in a particular cell in the first map changes by more than a first predefined threshold between one scan and the next, before remaining substantially constant for a first predefined number of scans, then the substantially constant data for the particular cell is copied from the first map to the second map.

Preferably, a range cell of the ATC Radar is smaller than 60 meters.

Preferably, interpolation of a received signal is performed to align the azimuthal co-ordinates of the complex clutter maps with the actual azimuthal position of the ATC Radar's antenna.

Preferably, if a return is received from a wind turbine blade, which is substantially higher than other returns from the same transmit burst, then the substantially higher return is either ignored or attenuated to conform to other returns from the same transmit burst.

Preferably, the method further comprises the step of calculating CFAR for a particular cell on the basis of returns from adjacent cells, wherein if at least one return from the adjacent cells exceeds a certain threshold, the at least one return is disregarded in the CFAR calculation.

According to a second aspect of the present invention, there is provided an ATC Radar arranged to: create first and second complex clutter maps using received I and Q signals, wherein the first map comprises data which is dynamically updated on a per-scan basis and the second map comprises data indicative of a static environment with no targets; subtract data from the second map from the received I and Q signals to mitigate the effects of static objects in the environment, to yield compensate I and Q data; and use the compensated I and Q data I for target tracking.

Preferably, the first and second complex clutter maps each comprise a plurality of cells, each cell corresponding to a defined region, and wherein if data recorded in a particular cell in the first map changes by more than a first predefined threshold between one scan and the next, before remaining substantially constant for a first predefined number of scans, then the ATC Radar is arrange to copy the substantially constant data for the particular cell from the first map to the second map.

Preferably, the ATC Radar is arranged to use a range cell of smaller than 60 meters.

Preferably, the ATC Radar is arranged to interpolate a received signal to align the azimuthal co-ordinates of the complex clutter maps with the actual azimuthal position of the ATC Radar's antenna.

Preferably, if a return is received from a wind turbine blade, which is substantially higher than other returns from the same transmit burst, then the ATC Radar is arranged to either ignore the substantially higher return or attenuate it to conform to other returns from the same transmit burst.

Preferably, the ATC Radar is arranged to calculate CFAR for a particular cell on the basis of returns from adjacent cells, wherein if at least one return from the adjacent cells exceeds a certain threshold, the ATC Radar is arranged to disregard the at least one return.

According to the present invention there is provided an apparatus and method as set forth in the appended claims.

Other features of the invention will be apparent from the dependent claims, and the description which follows.

BRIEF DESCRIPTION OF THE FIGURES

For a better understanding of the invention, and to show how embodiments of the same may be carried into effect, reference will now be made, by way of example, to the accompanying diagrammatic drawings in which.

DETAILED DESCRIPTION OF PREFERRED EMBODIMENT

Figure 1:
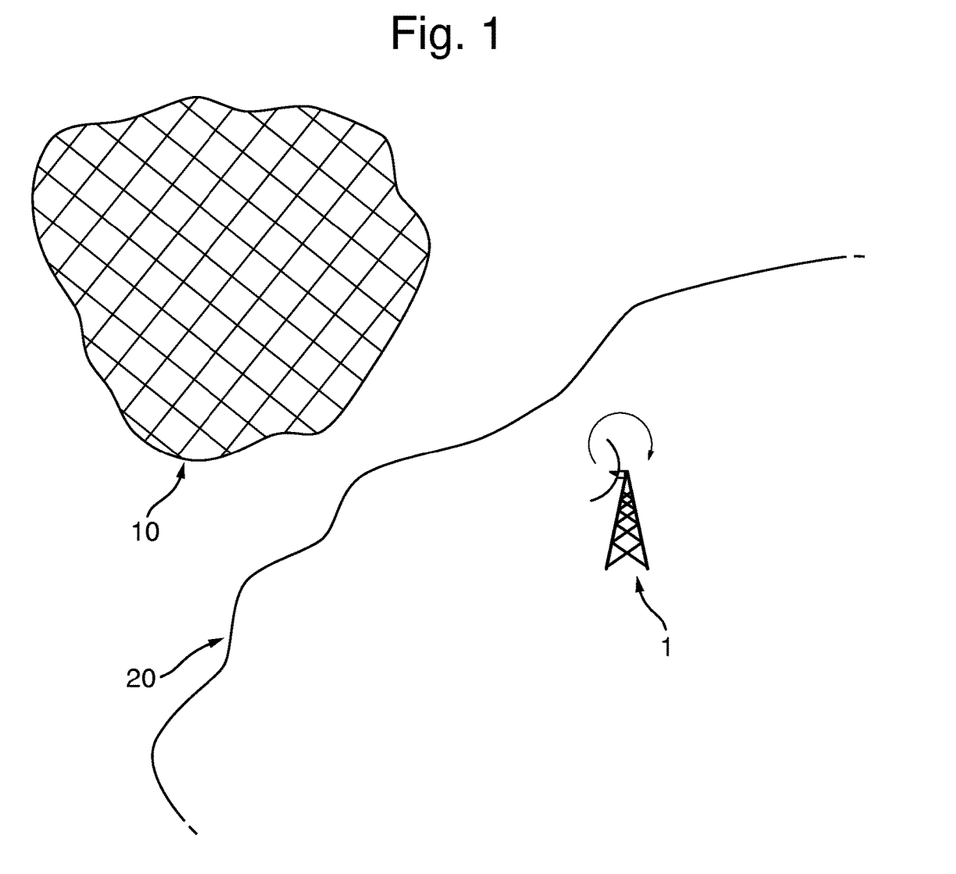
FIG. 1 shows a representation of a coastline, a windfarm and an ATC Radar installation.

FIG. 1 shows a typical installation of an ATC Radar 1, positioned near an airfield (not shown). The ATC Radar 1 is located near a shoreline 20 and, located some distance offshore is a windfarm 10, comprising a plurality of individual wind turbines.

In the prior art, a high level of noise would be experienced in the returns emanating from the windfarm 10, and the Radar 1 would have to ignore returns from the azimuthal range corresponding to the windfarm. In practice, however, it is unlikely that a windfarm would even have been constructed in the location shown.

There are two main sources of returns from windfarms: those due to the pylon or support tower; and those due to the rotary blades. The pylons are static and so using Moving Target Detection (MTD), Moving Target Indication (MTI) or Doppler Processing (DP), each of which is well known in the art, can remove their effect from the overall return. However, large structures, such as the pylons can 'leak' into the MTD/MTI/DP channels and so it is not possible to rely solely on Doppler processing to filter out the effects of large static objects.

The rotating blades pose a different problem. The dimensions of the blades are often of a similar order to certain dimensions of aircraft and they often move at a similar rate, which means that MTD/MTI/DP processing cannot be used to account for and effectively remove them from the returns. For instance, the Radar cross-section (RCS) of a static tower may be of the order of 100,000 $m^2$, and that of a blade may be 1,000 $m^2$. By contrast, the RCS of a large passenger aircraft may be of the order of 100 $m^2$ and that of a military jet fighter aircraft could be as low as 1 $m^2$. It can be seen that the level of return of the 'wanted' targets is far lower than that produced by the clutter (i.e. the turbines).

The rotation of the blade produces a significant return, which is visible in the results of the Doppler processing performed in the MTD/MTI/DP process. Other means are therefore required in order to discriminate returns from rotating blades.

Embodiments of the present invention make use of the complex or I and Q (In-phase and Quadrature-phase) return signals to build up a high-resolution complex clutter map of the area around the Radar. 'Complex', in this context, refers to the I and Q components of the returns. Prior art clutter maps are known which record power or so-called log mod data, rather than complex (I and Q) data.

Figure 2:
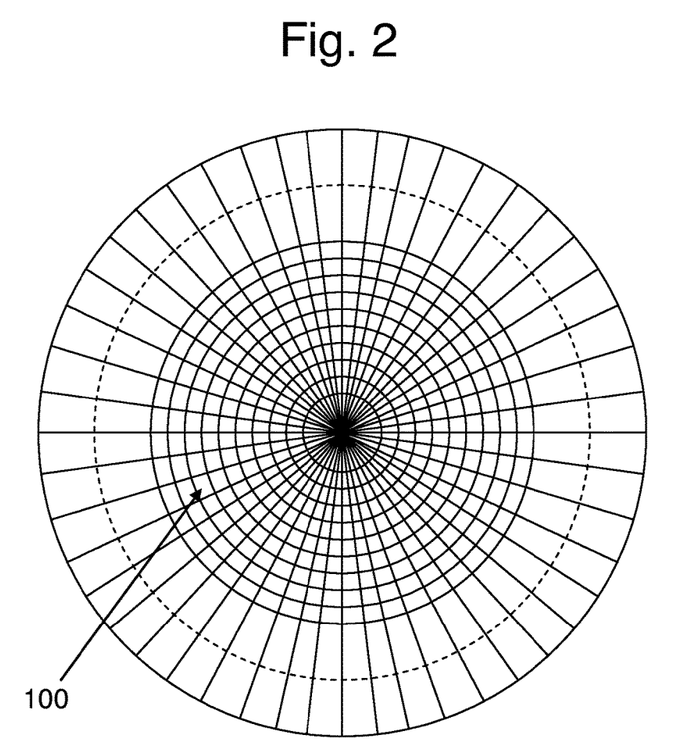
FIG. 2 shows a graphical representation of a clutter map according to an embodiment of the present invention.

FIG. 2 shows the structure, in principle, of such a map. It comprises a series of concentric circles spaced apart by a distance equivalent to a range cell of the Radar system. There are a plurality of spokes radiating from the Radar position, spaced apart by the pulse resolution of the Radar system. The pulse resolution is determined by the Pulse Repetition Interval (PRI).

Each return received from a transmission of the Radar can be assigned to one of the cells 100 of the complex clutter map. Note that a cell of the complex clutter map is not the same as a Radar range cell. A cell of the complex clutter map is associated with both range (distance from the Radar) and azimuth, and defines a region. For a 3-dimensional (3-d) Radar, elevation information can also be recorded. Whether 2-d or 3-d data is recorded, the complex clutter map records spatial information relevant to a defined region, either 2-d or 3-d.

Over an extended period of time the returns received for each cell in the complex clutter map tend towards a constant value (actually, a pair of I/Q values). By storing these constant values, it is possible, when receiving returns in real time, to detect a change from the long-term constant value. This difference in the received return (amplitude and phase) is indicative of a target in the vicinity of the wind turbines.

In fact, two complex cutter maps are used for a particular Radar frequency. If the Radar used two frequencies for transmission (e.g. E and F band, which is common), then there will be a total of four complex clutter maps used—two for each frequency.

A first complex clutter map is created and updated in real time and reflects 'live' I and Q data received by the Radar system. For instance, if an aircraft flies over the windfarm, the values stored in cells of the complex clutter map from which returns are received will vary from scan to scan as the aircraft passes. If the changes in the I and Q were observed in real time, it would be possible to infer the track of the aircraft by the changes in the respective values.

The second complex clutter map is intended to represent the static situation of the environment, and not be updated in real time. That is, the values stored in the second complex clutter map are what would be expected to be received by the Radar in the absence of any targets and represents returns only from the fixed environment, including, of course, any windfarm pylons. Over time, the values in the second map settle to a substantially constant value. However, the data stored in the second map must be able to be altered to take account of changes to the environment. For instance, a new pylon may be erected which needs to be taken account of, or a service vessel may moor in the vicinity of the windfarm, and needs to be selectively ignored or taken account if, just as the pylons are.

In order to provide this adaptability, there is a defined relationship between the first and second map. In the scenario referred to above, where a service vessel is moored in the vicinity of the wind farm, the movement of the vessel as it is mooring will be reflected in changing values in one or more cells of the first map. However, once the vessel is stationary, the respective cells will return substantially constant values.

It is desirable to be able to selectively ignore the vessel by updating the data in the second map to reflect the new static object. This can be achieved by detecting a change in a cell of the first map and then detecting when it no longer changes. The initial change needs to be at or above a defined threshold and the subsequent stabilisation can also be made subject to a threshold requirement. Once the value has stabilised, the new static value which is stored in the first map is copied to the corresponding cell of the second map. In order to ensure that changes are not made too frequently, and to ensure that the second map truly represents the static situation, the data from the first map may only be copied to the second map after a defined number of scans showing no change. This defined number can be set on a case by case basis, but as a starting point, if two successive scans show no change in a value which has previously changed, then the data is copied across from the first to the second map.

The raw or unprocessed I and Q data which is used to populate the first map, forms the basis for all subsequent processing by the Radar. However, unlike in a prior art system, there now exists in the second map, details of the static environment in which the Radar operates. This data is also in the form of I and Q data and can be subtracted from the raw I and Q data to give compensated data which is then only attributable to moving objects and potential targets.

In a similar process, if a target detection process has identified a target, and it was also there in a previous scan, then the truly static data from the second map is copied into the first map. This ensures that any changes in the raw I and Q data which are otherwise used to update the first map can be easily detected and this avoids the problem of a slow decay back to a constant value as the target moves.

The complex clutter maps are frequency dependent, so in a typical ATC Radar system which uses two frequencies within a given band, there is a pair of complex clutter maps provided for each frequency band, and the relevant maps are used with the corresponding frequency.

This technique is made possible by the use of interpolation and extrapolation techniques, meaning that it is possible to estimate with a relatively good degree of accuracy returns which would be received from between two actual transmit pulses. Effectively, this enables 'gaps' in the returns to be filled in by interpolating the results and so estimating the returns from said gaps.

Interpolation is required, since the timing of a transmit pulse is not synchronised to the azimuthal position of the antenna. It is not therefore possible to guarantee that a particular pylon will be fully illuminated in any particular scan. Interpolation techniques are therefore required to fill in the gaps in the received signals.

The complex clutter map shown in FIG. 2 is defined in terms of fixed azimuthal positions and on a given scan, these fixed positions may not align with transmissions from the Radar antenna. An assumption is made that changes between adjacent cells in the complex clutter map are gradual and smooth, allowing interpolation to be used to account for the non-alignment of the complex clutter maps with the actual azimuthal position of transmission.

The large static components, attributable to the pylons are removed by interpolating between the map values of I and Q at each range cell for the azimuth cells adjacent to the azimuth of the current PRI to determine the value of I and Q that would be expected at that range cell for that azimuth and transmitted frequency, and subtracting these I and Q values from the I and Q values at each range cell, respectively. This is contrast to prior art (i.e. non-complex) clutter maps, which are generally only concerned with power or log power, and not complex values.

Therefore, when returns are received from the direction and range of the windfarm, whose data is stored in the complex clutter maps, a comparison is made with the second map, which represents the long-term average returns and, from this comparison, it is possible to determine if the returns currently being received represent a moving target amongst the returns from the pylons in the windfarm.

Since the effect of the pylons can be eliminated at the I and Q level, this represents a low loss means of reducing the effect of static returns from the windfarm in a way which also prevents the pylon returns from breaking through into the MTD/MTI/DP processing as a result of the spectral spread caused by the antenna rotation.

In addition to the complex clutter maps referred to above, a Radar system of the present embodiment can make use of conventional (non-complex) high resolution clutter power residue maps, which may be provided for the MTI/MTD/DP channels as well as the Normal Radar (NR) channel. In these, multiple filter outputs may be produced, as in MTD processing, and such maps may be applied per filter, as well as on the combined output in either a summing or a selection process (e.g. GOF (Greater of Filter) processing).

Using much higher azimuth and range resolution within the wind farm than is usually used in ATC Radar systems means that the turbine returns from the rotating blades can be suppressed without suppressing target returns from between the blades.

To further increase the effectiveness of this technique, the size of the Radar range cell is made smaller than would normally be the case for ATC Radar systems. In a prior art ATC Radar, the size of the range cell would be in the region of 60 to 240 meters (or greater, in some cases). This is acceptable in most situations, but does not readily allow the effects of wind turbines to be mitigated. A typical turbine blade is in the region of 60 meters long, and they are spaced, typically, 600 meters apart, so there is insufficient resolution in the system to distinguish an object of this size using a range cell size according to the prior art.

ATC systems do not generally need to have range cells smaller than 60 or 240 meters, since the resolution they are required to have is connected with the objects or targets they are expecting to track i.e. aircraft. However, naval Radar systems often have a smaller range cell, since they require greater resolution due to the objects or targets which they are expected to track, such as incoming threats, missiles or similar.

There has, therefore, been no need before now to provide ATC Radar systems with smaller range cells, since there was simply no requirement to do so. However, in order to assist in mitigating the effects of windfarms, a smaller range cell can allow the ATC Radar system to effectively see between the turbines of the windfarm and pick out targets amongst the turbines, or at least in the vicinity of the turbines. It is found that a range cell in the region of 30 meters is adequate, although smaller range cells will give better resolution.

A drawback to using a smaller range cell is that increased processing power is required in the Radar system to process the increased number of returns which are received. In prior art systems, processing power was at a premium and any increase in the required processing power could be technically problematic and prohibitively expensive. However, advances in the availability of powerful processing system at a more reasonable cost allows smaller range cells to be used in embodiments of the present invention.

In most Radar systems, there is a process called Constant False Alarm Rate (CFAR) which acts to ensure that there is a constant or near-constant level of false alarms or detections. In effect CFAR averages returns and scales them so that any returns above the average 'noise' by a defined threshold, will register as a valid return so that returns from a locally high density of clutter will still only produce a low number of plots. However, if a small target is within such an area, it may also be suppressed, undesirably. This is particularly true in a wind farm scenario where the local clutter typically consists of relatively low background returns from between the turbines, with relatively very high returns from the turbines themselves, even after these returns have been suppressed using the various clutter maps referred to previously.

These turbine returns, if included in the calculation of the background level, results in the CFAR suppressing targets which are within and/or close to the wind farm. This particular problem is overcome by the use of so-called "censored CFAR", which has the effect of not including turbine returns in the calculation of the background average level. Other censored CFAR techniques are known from the prior art, but these are used to prevent targets from suppressing the detection of other nearby targets e.g. two aircraft flying in formation, or two or more ships travelling in convoy, which could mutually suppress the detection of the other.

However, the censoring which is used in embodiments of the present invention differs from these prior art techniques in that the number of censored cells per unit area is selected to tally with the expected maximum number of turbine contaminated returns. This has the effect of minimising the suppression of targets by the presence of the wind farm. In other words, when calculating CFAR for a particular cell, adjacent cells are examined, in the usual way. If, amongst the returns from the one or more adjacent cells, there is at least one return which is significantly higher than the other returns, then this can skew the calculated average, and adversely affect the CFAR calculation for the particular cell.

Any such return which is significantly higher than a defined threshold, then this can be treated as an outlier or statistical anomaly and can be ignored for the purposes of CFAR calculation. This is the concept underlying what is described herein as censored CFAR. The threshold above which a particular return must lie in order to be considered as an outlier can be set in advance or determined on a case-by-case basis.

A particular problem with implementing maps for an area having a windfarm is that as the blades of the turbine rotate, they are not always in a position that is illuminated by the Radar. This means that there is sometimes little or no return from a particular blade or turbine but, if the blade is in a certain position such that it returns a large signal, it can easily swamp any other signals. The net result of this is that the returns from the vicinity of the windfarm are very 'spiky', and there is a large variation in the amplitude of returns, depending on whether a particular blade is fully illuminated or not. A similar phenomenon is experienced with helicopters, when 'bladeflash' can occur, caused by a certain combination of blade position/orientation and Radar illumination. 'Bladeflash' is used in this context to refer to a high return caused by a similar phenomenon with turbines.

Typically, such bladeflashes are hundreds of times stronger than a typical large return from the Radar, but only occur infrequently and last for less than a single PRI for a typical E/F band radar. They therefore produce a strong response in only one pulse of a coherent burst as used by MTD/MTI/DP Radars. It is therefore possible to compensate for the bladeflash by not processing the burst which contains the bladeflash or by processing the burst with the corrupted pulse removed or replaced with a return calculated to repair the burst i.e. so that it appears as though the bladeflash never happened. Any processing which is preformed to compensate for the bladeflash is carried out before the burst's data is used to update any clutter map before being filtered via an MTD/MTI/DP process.

Since the return from a wind turbine's blades cannot be accurately predicted, since it cannot be known in advance when bladeflash will occur, it is not possible to use the returns to update the clutter residue maps in a straightforward manner, using an alpha smoothed map, as is normal practice in prior art ATC Radar systems. Such a map would contain the average return from the turbine, which would be enormously skewed by occasional occurrences of bladeflash. In order to address this problem, the map use can be altered in the vicinity of the windfarm and particularly in the location of individual turbines, identified by their locally raised long term returns (or map values). In the region of a wind farm, particular rules can be defined to further suppress turbine returns, based on the variability of turbine returns. For instance, these rules can be relatively simple, e.g. if a return is above a pre-set threshold more often than N times in a window of M scans, then attenuate the signal in that location by an amount based on signal levels observed in the past from that same location. More complex rules, based on statistical and time variations of the returns from that location measured over a specified M scans can be defined. The value of M can be selected based on trials data or it can be calculated in real time from past observations.

Figure 3:
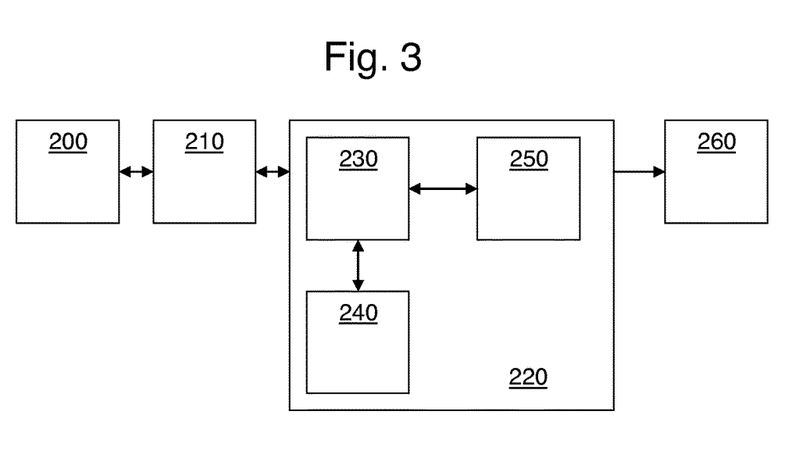
FIG. 3 shows a hardware implementation of a Radar according to an embodiment of the present invention.

FIG. 3 shows a schematic of a hardware realisation of an embodiment of the present invention. The system comprises an antenna 200, which is identical with antennas known from the prior art. The antenna is connected to an RF unit 210, which comprises a transmitter and a receiver for transmitting and receiving signals respectively. The input to the RF unit 210 is digital and the output from the RF unit is digital. The RF unit 210 is connected to the DSP Unit 220. The DSP unit 220 comprises a processor 230, which is operatively coupled to a program store 240 and a working memory 250. The program store stores a program for performing a method according to an embodiment of the present invention as previously described. The working memory is used to store the complex clutter maps and other data which is processed by the processor 230 under instructions from the program store 240. In reality, the DSP unit 220 may comprise a plurality of processors, and the representation shown here is illustrative only.

The DSP Unit 220 is connected to a display unit 260, which is used by an ATC operator to monitor targets in the usual way.

By use of one or more of a high resolution complex clutter map, combined with smaller than usual range cells, blade flash suppression and censored CFAR, embodiments of the resent invention are able to effectively discount the effect of windfarms on the returns which are received by the Radar.

At least some embodiments of the invention may be constructed, partially or wholly, using dedicated special-purpose hardware. Terms such as 'component', 'module' or 'unit' used herein may include, but are not limited to, a hardware device, such as a Field Programmable Gate Array (FPGA) or Application Specific Integrated Circuit (ASIC), which performs certain tasks. Alternatively, elements of the invention may be configured to reside on an addressable storage medium and be configured to execute on one or more processors. Thus, functional elements of the invention may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Further, although the example embodiments have been described with reference to the components, modules and units discussed below, such functional elements may be combined into fewer elements or separated into additional elements.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of operating an air traffic control (ATC) Radar, the method comprising:
   receiving, via a fixed ground-based antenna, In-phase (I) and Quadrature (Q) signals;
   creating, by a radar signal processing unit, first and second complex clutter maps using the I and Q signals, the first map including pairs of I and Q signal data which is dynamically updated on a per-scan basis, the second map including pairs of I and Q signal data indicative of a static environment with no targets;
   subtracting, by the radar signal processing unit on each scan of the I and Q signals, the pairs of I and Q signal data in the second map from the received I and Q signals to mitigate the effects of static objects in the environment, to yield compensated I and Q data; and
   using the compensated I and Q data for at least one of target detection and tracking,
   wherein if a return is received from a wind turbine blade, which is substantially higher than other returns from the same transmit burst, then the substantially higher return is either ignored or attenuated to conform to other returns from the same transmit burst, and
   wherein the first and second complex clutter maps each comprise a plurality of cells, each cell corresponding to a defined region, and wherein if data recorded in a particular cell in the first map changes by more than a first predefined threshold between one scan and the next, before remaining substantially constant for a first predefined number of scans, then the substantially constant data for the particular cell is copied from the first map to the second map, otherwise the data is not copied to the second map.

2. The method of claim 1 wherein a range cell of the ATC Radar is smaller than 60 meters.

3. The method of claim 1 wherein interpolation of a received signal is performed to align azimuthal co-ordinates of the complex clutter maps with an actual azimuthal position of the ATC Radar's antenna.

4. The method of claim 1 further comprising calculating constant false alarm rate (CFAR) for a particular cell on the basis of returns from adjacent cells, wherein if at least one return from the adjacent cells exceeds a certain threshold, the at least one return is disregarded in the CFAR calculation.

5. An air traffic control (ATC) Radar arranged to:
   create first and second complex clutter maps using received I and Q signals, the first map including pairs of I and Q signal data which is dynamically updated on a per-scan basis, the second map including pairs of I and Q signal data indicative of a static environment with no targets;
   subtract the pairs of I and Q signal data in the second map from the received I and Q signals on each scan of the I and Q signals to mitigate the effects of static objects in the environment, to yield compensated I and Q data; and
   use the compensated I and Q data for at least one of target detection and tracking,
   wherein if a return is received from a wind turbine blade, which is substantially higher than other returns from the same transmit burst, then the ATC Radar is arranged to either ignore the substantially higher return or attenuate it to conform to other returns from the same transmit burst, and
   wherein the first and second complex clutter maps each comprise a plurality of cells, each cell corresponding to a defined region, and wherein if data recorded in a particular cell in the first map changes by more than a first predefined threshold between one scan and the next, before remaining substantially constant for a first predefined number of scans, then the ATC Radar is further arranged to copy the substantially constant data for the particular cell from the first map to the second map, otherwise the data is not copied to the second map.

6. The ATC Radar of claim 5 further arranged to use a range cell of smaller than 60 meters.

7. The ATC Radar of claim 5 further arranged to interpolate a received signal to align azimuthal co-ordinates of the complex clutter maps with an actual azimuthal position of the ATC Radar's antenna.

8. The ATC Radar of claim 5 wherein the ATC Radar is arranged to calculate constant false alarm rate (CFAR) for a particular cell on the basis of returns from adjacent cells, wherein if at least one return from the adjacent cells exceeds a certain threshold, the ATC Radar is further arranged to disregard the at least one return.

9. The method of claim 1 further comprising calculating constant false alarm rate (CFAR) for a particular cell on the basis of returns from adjacent cells, wherein if at least one return from the adjacent cells exceeds a certain threshold, the at least one return is disregarded in the CFAR calculation.

10. A non-transitory storage medium encoding instructions that when executed by one or more processors cause a process to be carried out for operating an air traffic control (ATC) Radar, the process comprising:
   receiving In-phase (I) and Quadrature (Q) signals;
   creating first and second complex clutter maps using the I and Q signals, the first map including pairs of I and Q signal data which is dynamically updated on a per-scan basis, the second map including pairs of I and Q signal data indicative of a static environment with no targets;
   subtracting the pairs of I and Q signal data in the second map from the received I and Q signals on each scan of the I and Q signals to mitigate the effects of static objects in the environment, to yield compensated I and Q data; and using the compensated I and Q data for at least one of target detection and tracking, wherein if a return is received from a wind turbine blade, which is substantially higher than other returns from the same transmit burst, then the substantially higher return is either ignored or attenuated to conform to other returns from the same transmit burst, and wherein the first and second complex clutter maps each comprise a plurality of cells, each cell corresponding to a defined region, and wherein if data recorded in a particular cell in the first map changes by more than a first predefined threshold between one scan and the next, before remaining substantially constant for a first predefined number of scans, then the process further includes copying the substantially constant data for the particular cell from the first map to the second map, otherwise the data is not copied to the second map.

11. The storage medium of claim 10, the process further comprising calculating constant false alarm rate (CFAR) for a particular cell on the basis of returns from adjacent cells, wherein if at least one return from the adjacent cells exceeds a certain threshold, the at least one return is disregarded in the CFAR calculation.

12. The storage medium of claim 10 wherein a range cell of the ATC Radar is smaller than 60 meters.

13. The storage medium of claim 10 wherein interpolation of a received signal is performed to align azimuthal co-ordinates of the complex clutter maps with an actual azimuthal position of the ATC Radar's antenna.

14. The storage medium of claim 10, the process further comprising calculating constant false alarm rate (CFAR) for a particular cell on the basis of returns from adjacent cells, wherein if at least one return from the adjacent cells exceeds a certain threshold, the at least one return is disregarded in the CFAR calculation.

* * * * *